(12) United States Patent
Hamerla et al.

(10) Patent No.: US 12,118,436 B2
(45) Date of Patent: Oct. 15, 2024

(54) AUTOMATED USER APPLICATION TRACKING AND VALIDATION

(71) Applicant: Disney Enterprises, Inc., Burbank, CA (US)

(72) Inventors: Dustin Stefan Hamerla, Kew Gardens, NY (US); Abrasham Chowdhury, North Babylon, NY (US); Christopher Adam Boyle, Wayne, NJ (US); Joseph H. I. Bird, Staten Island, NY (US); Melissa Ashley Moyer, New York, NY (US); Kyle Patrick Baker, Brooklyn, NY (US); Taylor C. Wells, New York, NY (US); Vaibhav Jajoo, Fremont, CA (US)

(73) Assignee: Disney Enterprises, Inc., Burbank, CA (US)

( * ) Notice: Subject to any disclaimer, the term of this patent is extended or adjusted under 35 U.S.C. 154(b) by 892 days.

(21) Appl. No.: 17/156,069

(22) Filed: Jan. 22, 2021

(65) Prior Publication Data

US 2022/0237501 A1    Jul. 28, 2022

(51) Int. Cl.
| | | |
|---|---|---|
| *G06N 20/00* | (2019.01) | |
| *G06F 3/0481* | (2022.01) | |
| *G06F 11/34* | (2006.01) | |
| *G06F 18/21* | (2023.01) | |
| *G06F 18/214* | (2023.01) | |

(52) U.S. Cl.
CPC .......... *G06N 20/00* (2019.01); *G06F 3/0481* (2013.01); *G06F 11/3438* (2013.01); *G06F 18/214* (2023.01); *G06F 18/217* (2023.01)

(58) Field of Classification Search
CPC ... G06N 20/00; G06F 3/0481; G06F 11/3438; G06F 18/214; G06F 18/217; G06F 3/0482; G06F 3/0485; G06F 2201/86; G06F 2218/00
See application file for complete search history.

(56) References Cited

U.S. PATENT DOCUMENTS

| | | |
|---|---|---|
| 9,075,914 B2 | 7/2015 | Huggins |
| 10,007,493 B1 | 6/2018 | Totale et al. |
| 10,146,672 B2 | 12/2018 | Avadhanula et al. |
| 10,530,795 B2 | 1/2020 | Pande et al. |
| 10,671,692 B2 | 6/2020 | Koopman et al. |
| 10,721,256 B2 | 7/2020 | Urmanov et al. |
| 2014/0067734 A1* | 3/2014 | Hawkins ................. G06N 7/01 706/58 |

(Continued)

*Primary Examiner* — Hope C Sheffield
(74) *Attorney, Agent, or Firm* — Farjami & Farjami LLP (57) ABSTRACT

A system includes a computing platform including a hardware processor and a system memory storing a software code. The hardware processor is configured to execute the software code to track interactions with a user application during use of the user application, generate, based on tracking the interactions, interaction data identifying multiple interaction events during the use, and perform a validity assessment of the interaction data. The hardware processor is further configured to execute the software code to identify, based on the validity assessment, one or more anomalies in the interaction data, and output, based on identifying the one or more anomalies in the interaction data, one or more of the interaction events corresponding respectively to the one or more anomalies.

20 Claims, 7 Drawing Sheets

(56) References Cited

U.S. PATENT DOCUMENTS

2016/0173626 A1    7/2016  Volchok
2019/0166141 A1*  5/2019  Xu .......................... G06N 3/047
2021/0328969 A1*  10/2021  Gaddam ................. G06F 21/44

* cited by examiner

AUTOMATED USER APPLICATION TRACKING AND VALIDATION

BACKGROUND

Data science is focused on extracting information and insight from the analysis of large collections of data, also known as "big data." For example, data describing the use of direct-to-consumer software applications may be aggregated and analyzed in order to improve the user experience over time. Such data may be obtained from different versions of the software application each optimized for use on a different consumer electronics platform and may require validation to ensure its reliability before being put to use in performing data analytics.

In the conventional art, validation of data points involves several distinct and highly manual validation processes ranging from the generation of data points, the execution of validation algorithms, manual inspection of data in the performance of root-cause analysis, and failure remediation, for example. Due to this intense reliance on human participation, the conventional approach to data validation is undesirably costly and time consuming. Accordingly, there is a need in the art for an automated solution enabling the reliable collection and validation of user data.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing user application tracking and validation that address and overcome the drawbacks and deficiencies in the conventional art. It is noted that although the present data tracking and validation solution is described below in detail by reference to direct-to-consumer software applications, the present novel and inventive principles may more generally find other applications to data aggregation and validation within a data analytics pipeline.

It is further noted that the methods disclosed by the present application may be performed as substantially automated processes by substantially automated systems. As used in the present application, the terms "automation," "automated", and "automating" refer to systems and processes that do not require the participation of a human user. Although, in some implementations, a human data analyst may review the performance of the automated systems described herein, that human involvement is optional. Thus, the methods described in the present application may be performed under the control of hardware processing components of the disclosed automated systems.

It is also noted that the present application refers to different versions of a user application that provide analogous graphical user interfaces (GUIs) across the different software versions. As used in the present application, the term "version," when applied to a user application, refers to that user application being specifically configured for execution on a particular user device platform architecture. That is to say, the user application described herein has a non-uniform code base such that different versions of the user application may have different code bases for execution on different computing platforms.

Moreover, as used in the present application, a "machine learning model" refers to a mathematical model for making future predictions based on patterns learned from samples of data or "training data." Various learning algorithms can be used to map correlations between input data and output data. In various implementations, machine learning models may be designed to progressively improve their performance of a specific task. Also, as used in the present application, "bot" is a computer program that can execute commands, reply to messages, or perform tasks, either automatically or with minimal human intervention, such as operating as an agent for a user or another program, or simulating a human activity.

Figure 1:
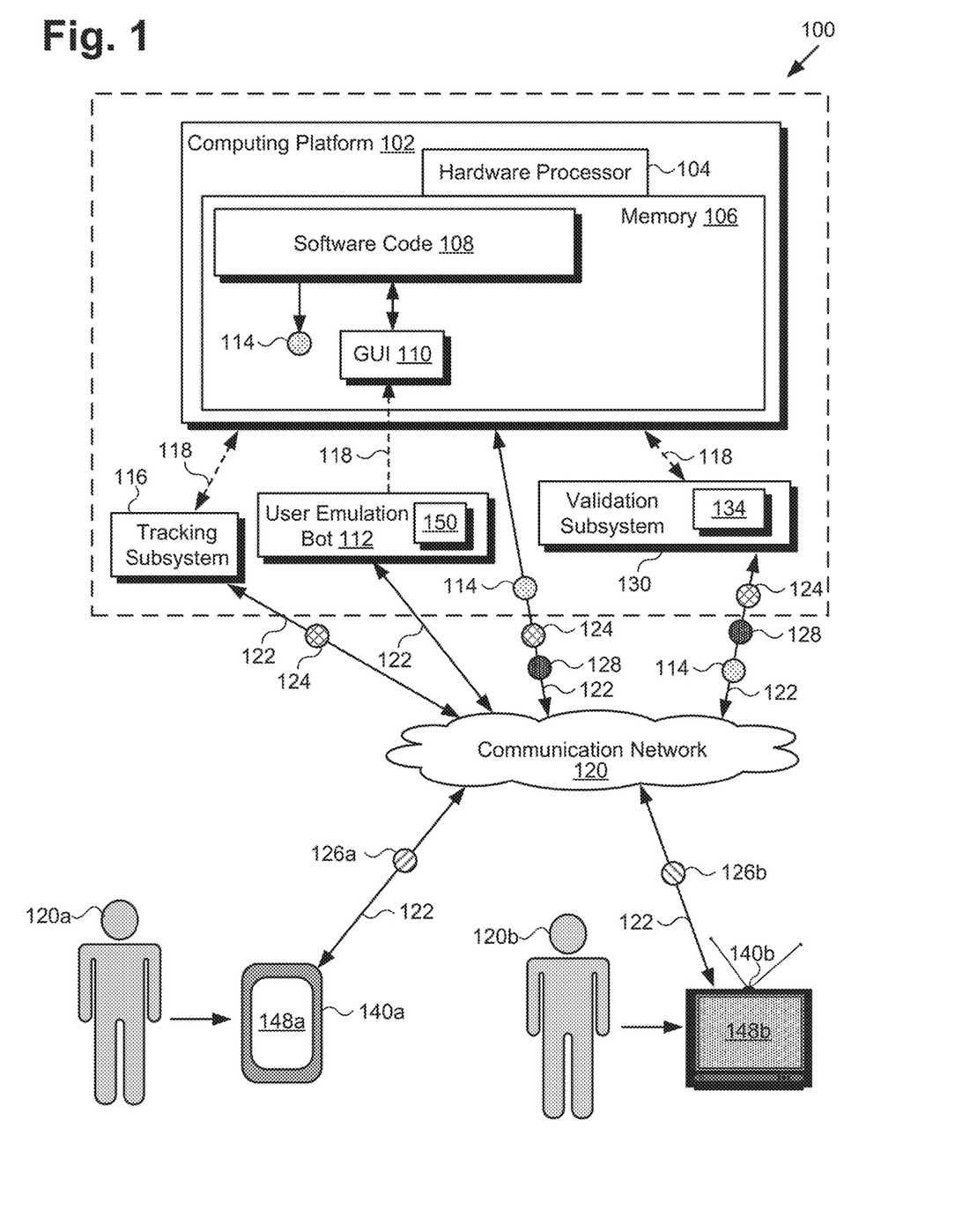
FIG. 1 shows an exemplary system for performing automated user application tracking and validation, according to one implementation.

FIG. 1 shows an exemplary system for performing automated user application tracking and validation. As shown in FIG. 1, system 100 includes computing platform 102 having hardware processor 104 and system memory 106 implemented as a non-transitory storage device. According to the present exemplary implementation, system memory 106 stores software code 108. As further shown in FIG. 1, in some implementations, system memory 106 may also store user emulation bot 112 including user application 150 providing graphical user interface GUI 110, as well as one or more anomalous interaction events 114 (hereinafter "anomalous interaction event(s) 114") output by software code 108 and described below by further reference to FIGS. 2, 3A, 3B, and 4. In addition, in some implementations, system 100 may include one or both of tracking subsystem 116 and validation subsystem 130 each communicatively coupled to computing platform 102. As also shown in FIG. 1, in some implementations, validation subsystem 130 may include anomaly predicting model 134 in the form of a machine learning model as described above.

System 100 is implemented within a use environment including communication network 120, user device 140a having display 148a and configured for use by user 120a, and user device 140b having display 148b and configured for use by user 120b. In addition, FIG. 1 shows interaction data 124 and validity assessment 128. It is noted that, in some implementations interaction data 124 may include first user interaction data 126a corresponding to user 120a and second user interaction data 126b corresponding to user 120b. Also shown in FIG. 1 are network communication links 122 of communication network 120 communicatively coupling computing platform 102 with user emulation bot 112, tracking subsystem 116, validation subsystem 130, and user devices 140a and 140b.

Although FIG. 1 depicts user emulation bot 112, tracking subsystem 116, and validation subsystem 130 as being communicatively coupled to computing platform 102 via communication network 120 and network communication links 122, that representation is merely exemplary. In other implementations, as also shown in FIG. 1, one or more of user emulation bot 112, tracking subsystem 116, and validation subsystem 138 may be in direct communication with computing platform 102 via direct communication links 118. In yet other implementations, one or more of user emulation bot 112, tracking subsystem 116, and validation subsystem 138 may be integrated with computing platform 102, or may take the form of respective software modules stored in system memory 106. Moreover, in some implementations, one or more of user emulation bot 112, tracking subsystem 116, and validation subsystem 130 may be omitted from system 100 and the functionality attributed to those subsystems may be performed by software code 108, or may be provided by one or more third party vendors independent of system 100.

It is noted that software code 108, when executed by hardware processor 104, is configured to track and validate use of user application 150. As noted above, user application 150 may include several different versions each specifically configured for execution on a particular user device platform architecture. Thus user application 150 may include a version (identified below by reference to FIG. 2 as user application 250a) having a code base for execution on user device 140a and another version (identified below by reference to FIG. 2 as user application 250b) having a different code base for execution on user device 140b. It is further noted that although the present figures depict two user devices and two versions of user application 150, more generally, more than two different versions of user device 150 may be utilized by a variety of different user devices. Consequently, user application 150 may include multiple different code base versions of an application providing GUI 110.

It is also noted that the use of user application 150 may be a simulated use or a real-world use. For example, in some implementations, user emulation bot 112 may simulate user interactions with the various versions of user application 150 in order to validate user application 150 prior to its release as a direct-to-consumer application, or as part of quality assurance after its release. Alternatively, or in addition, user emulation bot 112 may be configured to deploy an appropriate version of user application 150 to each of user devices 140a and 140b, and may execute the different versions of user application 150 deployed to user devices 140a and 140b. As yet another alternative, one or more of users 120a and 120b may engage in real-world interactions with different versions of user application 150 resident on respective user devices 140a and 140b.

Although the present application refers to software code 108, user emulation bot 112, and anomalous interaction event(s) 114 as being stored in system memory 106, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts system 100 as including single computing platform 102, that exemplary representation is provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. Thus, in some implementations, computing platform 102 may include a first server hosting software code 108 and another server hosting user emulation bot 112 and communicatively coupled to the first server hosting software code 108.

Although user devices 140a and 140b are shown as a tablet computer and a smart television (smart TV), respectively, in FIG. 1, those representations are also provided merely as examples. More generally, user devices 140a and 140b may be any suitable mobile or stationary computing devices or systems that implement data processing capabilities sufficient to enable use of GUI 110, support connections to communication network 120, and implement the functionality attributed to user devices 140a and 140b herein. For example, in other implementations, user devices 140a and 140b may take the form of desktop computers, laptop computers, smartphones, game consoles, smart watches, or other smart wearable devices, for example.

Displays 148a and 148b of respective user devices 140a and 140b may take the form of liquid crystal displays (LCDs), light-emitting diode (LED) displays, organic light-emitting diode (OLED) displays, quantum dot (QD) displays, or displays using any other suitable display technology that performs a physical transformation of signals to light. It is noted that, in some implementations, displays 148a and 148b may be integrated with respective user devices 140a and 140b, such as when user devices 140a and 140b take the form of tablet computers or smart TVs for example. However, in other implementations, for example where user devices 140a and 140b take the form of a computer tower in combination with a desktop monitor, displays 148a and 148b may be communicatively coupled to, but not physically integrated with respective user devices 140a and 140b.

As stated above, in the conventional art, validation of data points involves several distinct and highly manual validation processes ranging from the generation of data points, the execution of validation algorithms, manual inspection of data in the performance of root-cause analysis, and failure remediation, for example. Prior to the novel and inventive tracking and validation solution disclosed in the present application, validation of data points involved several separated, highly manual validation processes ranging from generation of data points, execution of validation algorithms and manual inspection of data to root-cause analysis and failure remediation. By contrast, the present solution integrates a scalable GUI tracking framework with simulated device testing and validation to create a highly automated and reliable solution that significantly reduces ongoing manual effort and advantageously enables new, specific validation methods that were not possible in the case of isolated processes.

System 100 enables emulation of any of the different versions of user application 150, as well as the execution of predefined user actions within those versions of user application 150. During such a simulated test run, interaction data 124 may be generated by tracking subsystem 116 and may be sent for validation by validation subsystem 130. In addition to tracking data, interaction data 124 may include metadata information about the type of user interaction scenario that was executed, and expected interaction data corresponding to the user interaction scenario (e.g., interaction data relating to expected user behavior). In some implementations, the tracked user interactions with user application 150 may be rendered into a playable video to help understand which user actions lead to which tracking data points. In addition, in some implementations, automated email, Slack, or JIRA notification and reporting capabilities may be included, while detailed error messages from the validation algorithms applied by validation subsystem 130 may be used to expedite root-cause analysis.

The automated testing enabled by system 100 is faster, less costly, and less prone to error than conventional tracking and validation solutions. Regarding the scale of improvement accruing from implementation of system 100, it is noted that rather than a handful of human analysts performing three to five tests per day as is the case in the conventional art, system 100 can test multiple versions of user application 150 concurrently to perform hundreds or thousands of tests per day. During a simulated user of user application 150 by user emulation bot 112, system 100 may be configured to perform validation of interaction data 124 in response to the use of user application 150 by user emulation bot 112. In some implementations, for example, system 100 may be configured to perform validation of interaction data 124 in real-time with respect to the use of user application 150 by user emulation bot 112.

Figure 2:
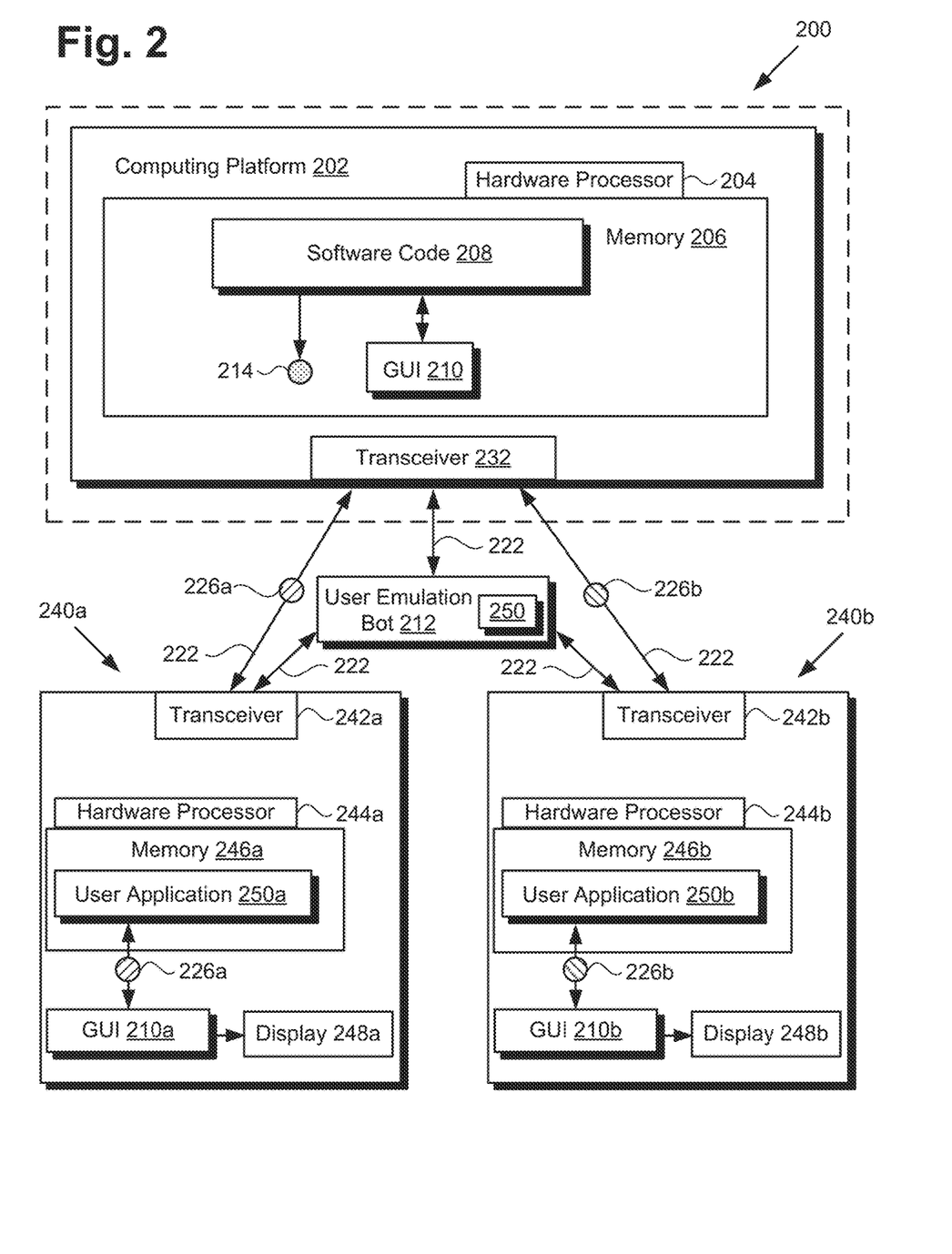
FIG. 2 shows a diagram including a more detailed exemplary representation of user devices communicatively coupled to the system shown in FIG. 1, according to one implementation.

FIG. 2 shows a more detailed representation of exemplary user devices 240a and 240b in combination with system 200 and user emulation bot 212 providing GUI 210, according to one implementation. As shown in FIG. 2, user devices 240a and 240b are communicatively coupled to system 200 and user emulation bot 212 by network communication links 222. System 200 is shown to include computing platform 202 having hardware processor 204, transceiver 232, and system memory 206 implemented as a non-transitory storage device. System memory 206 is shown to store software code 208, as well as one or more anomalous interaction events 214 (hereinafter "anomalous interaction event(s) 214"). In some implementations, as shown in FIG. 2, user emulation bot 212 may be omitted from system 200 and may be communicatively coupled to user devices 240a and 240b by network communication links 222. However, in other implementations, as discussed above, system memory 206 may store user emulation bot 212 including user application 250 providing GUI 210. It is noted that anomalous interaction event(s) 214 may include one or more of missing or incorrect sequences of events, unintended data duplication and non-unique primary keys across interaction event pairs, and incorrectly generated primary and foreign keys across interaction event pairs, for example.

As further shown in FIG. 2, user device 240a includes transceiver 242a, display 248a, hardware processor 244a, and memory 246a implemented as a non-transitory storage device storing user application 250a providing GUI 210a. In addition, user device 240b includes transceiver 242b, display 248b, hardware processor 244b, and memory 246b implemented as a non-transitory storage device storing user application 250b providing GUI 210b. Also shown in FIG. 2 are first user interaction data 226a generated on user device 240a, and second user interaction data 226b generated on user device 240b.

Network communication links 222, and system 200 including computing platform 202 having hardware processor 204 and system memory 206, correspond respectively in general to network communication link 122, and system 100 including computing platform 102 having hardware processor 104 and system memory 106, in FIG. 1. Thus, network communication links 222, and system 200 including computing platform 202, hardware processor 204, and system memory 206 may share any of the characteristics attributed to respective network communication links 122, and system 100 including computing platform 102, hardware processor 104, and system memory 106 by the present disclosure, and vice versa. As a result, like system 200, system 100 may include a feature corresponding to transceiver 232. Furthermore, although not shown in FIG. 2, system 200 may include features corresponding respectively to tracking subsystem 116 and validation subsystem 130 including anomaly predicting model 134 implemented as a machine learning model.

Software code 208, anomalous interaction event(s) 214, and user emulation bot 212 including user application 250 providing GUI 210, correspond respectively in general to software code 108, interaction event(s) 114, and user emulation bot 112 including user application 150 providing GUI 110, in FIG. 1. Consequently, software code 108, user application 150, GUI 110, user emulation bot 112, and anomalous interaction event(s) 114 may share any of the characteristics attributed to respective software code 208, user application 250, GUI 210, user emulation bot 212, and anomalous interaction event(s) 214 by the present disclosure, and vice versa. That is to say, like anomalous interaction event(s) 214, anomalous interaction event(s) 114 may include one or more of missing or incorrect sequences of events, unintended data duplication and non-unique primary keys across interaction event pairs, and incorrectly generated primary and foreign keys across interaction event pairs, for example.

User device 240a having display 248a, and user device 240b having display 248b correspond respectively in general to user device 140a having display 148a, and user device 140b having display 148b, in FIG. 1, and those corresponding features may share any of the characteristics attributed to either corresponding feature by the present disclosure. Thus, like user device 240a, user device 140a may include features corresponding to transceiver 242a hardware processor 244a, and memory 246a storing user application 250a providing GUI 210a. In addition, like user device 240b, user device 140b may include features corresponding to transceiver 242b hardware processor 244b, and memory 246b storing user application 250b providing GUI 210b.

It is noted that GUI 210 corresponds in general to GUI 110 and those corresponding features may share any of the characteristics attributed to either feature by the present application. It is further noted that, like displays 148a and 148b, displays 248a and 248b may take the form of LCDs, LED displays. OLED displays. QD displays, or displays using any other suitable display technology that performs a physical transformation of signals to light. Moreover, like user devices 140a and 140b, user devices 240a and 240b may take a variety of forms, such as desktop computers, laptop computers, smartphones, game consoles, smart watches, or other smart wearable devices, for example.

Transceivers 232, 242a, and 242b may be implemented as wireless communication hardware and software enabling user devices 140a/240a and 140b/240b to exchange data with system 100/200 via network communication links 122/222. For example, transceivers 232, 242a, and 242b may be implemented as fourth generation of broadband cellular technology (4G) wireless transceivers, as 5G wireless transceivers configured to satisfy the IMT-2020 requirements established by the International Telecommunication Union (ITU). Alternatively, or in addition, transceivers 232, 242a, and 242b may be configured to communicate via one or more of WiFi, Bluetooth, ZigBee, and 60 GHz wireless communications methods.

First user interaction data 226a generated on user device 240a and second user interaction data 226b generated on user device 240b correspond respectively in general to first user interaction data 126a corresponding to user 120a and second user interaction data 126b corresponding to user 120b. In other words, user first user interaction data 226a and second user interaction data 226b may share any of the characteristics attributed to respective first user interaction data 126a and second user interaction data 126b by the present disclosure, and vice versa. Thus, like first user interaction data 126a and second user interaction data 126b, first user interaction data 226a and second user interaction data 226b may be included in interaction data 124 in FIG. 1.

With respect to user applications 150/250, 250a, and 250b, it is noted that user application 250a is a version of user application 150/250 configured for use by the user device platform architecture of user device 140a/240a, while user application 250b is a version of user application 150/250 configured for use by the user device platform architecture of user device 140b/240b, as such versions are described above. User application 250a provides GUI 210a on user device 240a, while user application 250b provides analogous GUI 210b on user device 250b. It is noted that user application 150/250 may incorporate all user application versions, including any versions resident on user devices 140a/240a and 140b/240b, as well as any versions with which user emulation bot 112/212 simulates user interactions.

Figure 3A:
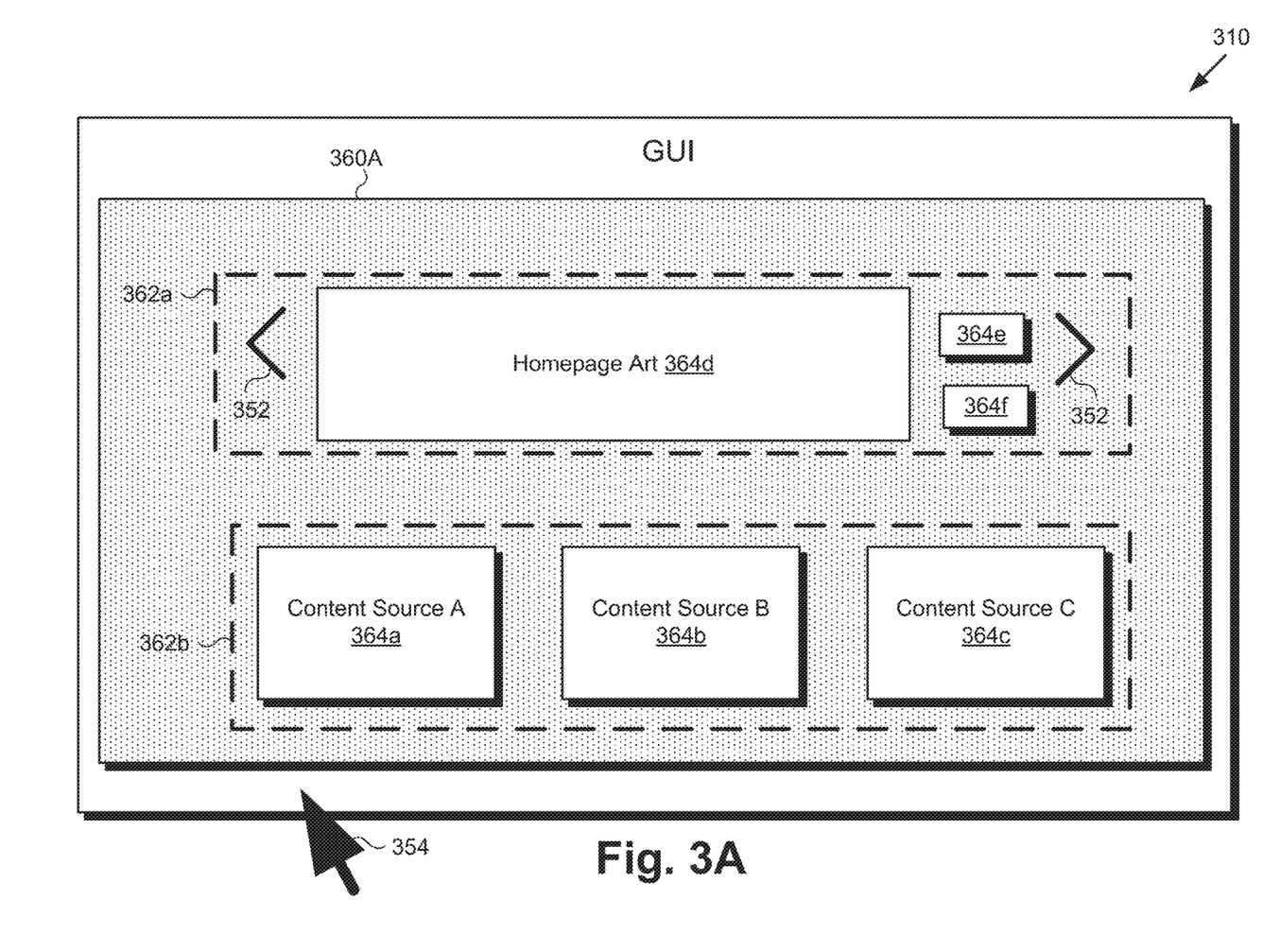
FIG. 3A shows an exemplary page view generated by a graphical user interface (GUI) provided by various versions of a user application, according to one implementation.

FIG. 3A shows an exemplary page view generated by GUI 310 provided by one or more of user applications 150/250/250a/250b, according to one implementation. As shown in FIG. 3 exemplary GUI 310 organizes and displays its contents by page, i.e., page 360A, containers, i.e., containers 362a and 362b, and elements, i.e., elements 364a, 364b, 364c, 364d, 364e, and 364f shown as tiles. It is noted that, as defined in the present application, the feature "page" refers to any displayed configuration of containers, while the feature "container" refers to any displayed configuration of elements. Moreover, as defined in the present application, the feature "element" refers to any of a variety of items that can be viewed or engaged with. Some examples of elements include, but are not limited to, buttons, clickable tiles, navigational items, input forms, check boxes, toggles, and text boxes.

It is noted that each page, container, and element has its own unique identifier (ID). That is to say, each page has a unique page ID, each container has a unique container ID, and each element has a unique element ID. As discussed in greater detail below by reference to flowchart 470, in FIG. 4, because a particular element may be displayed in more than one container and on more than one page, each instance of an element presented via GUI 310 is associated with the unique container ID of the container in which it appears and with the unique page ID of the page on which it appears.

Also shown in FIG. 3A are input object 354 (shown as an exemplary cursor in FIG. 3A) and elements in the form of horizontal scrolling selectors 352 usable by user 120a or user 120b, in FIG. 1, to interact with GUI 310. It is noted that GUI 310 corresponds in general to GUI 110/210, in FIGS. 1 and 2. That is to say, GUI 110/210 may share any of the characteristics attributed to GUI 310 by the present disclosure, and vice versa.

Figure 3B:
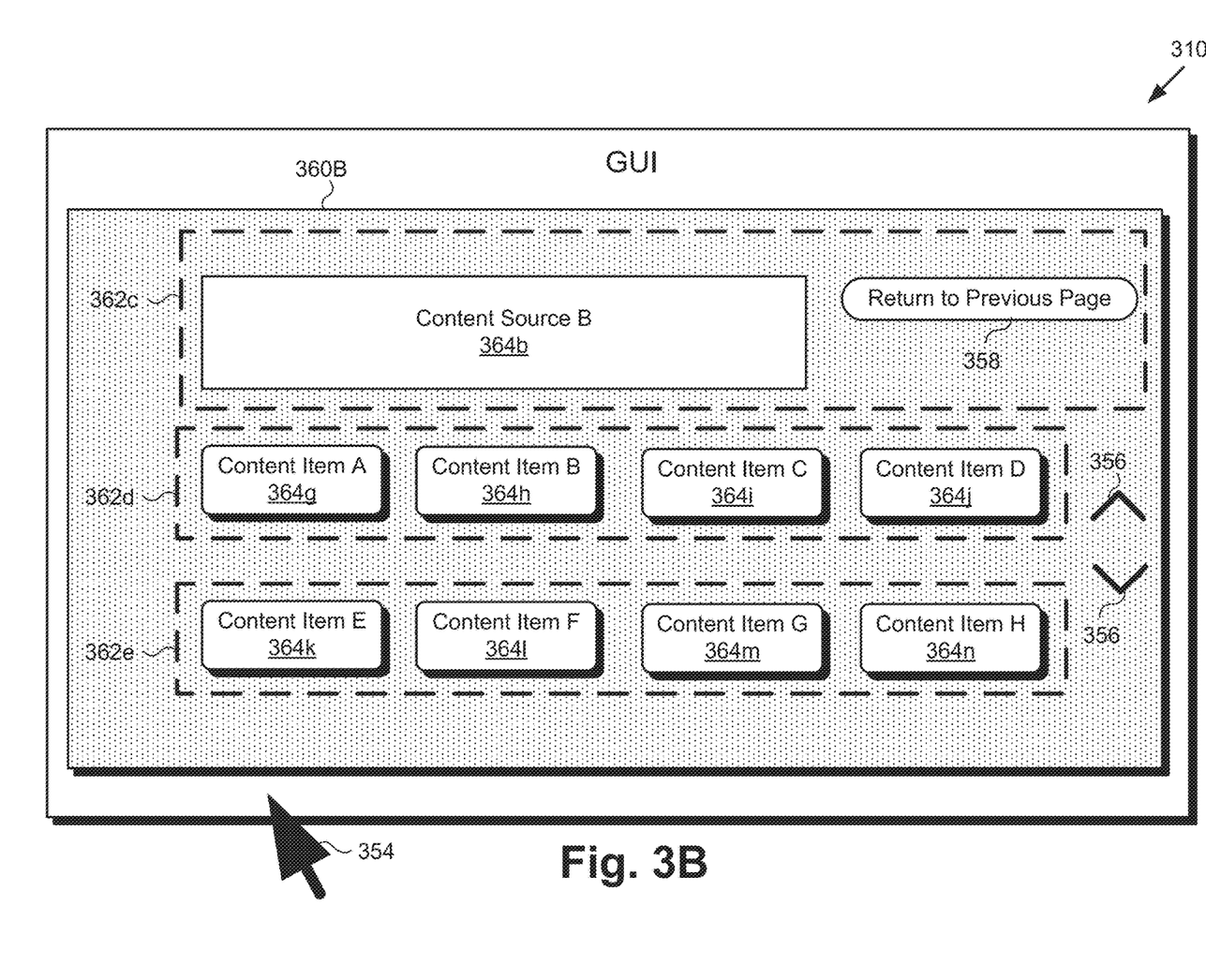
FIG. 3B shows another exemplary page view generated by the GUI provided by various versions of a user application, according to one implementation.
Figure 3C:
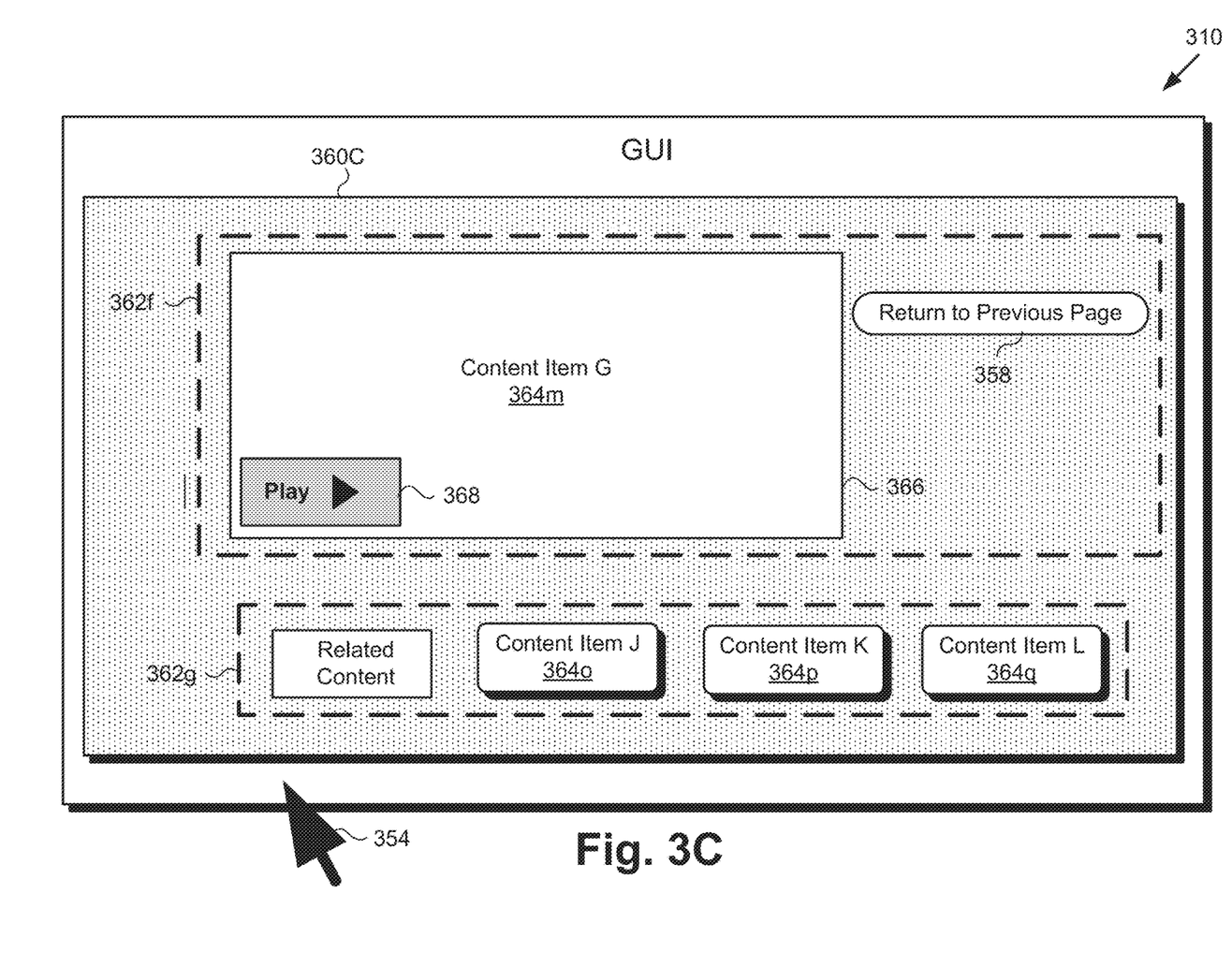
FIG. 3C shows yet another exemplary page view generated by the GUI provided by various versions of a user application, according to one implementation.

FIG. 3B shows another exemplary page view generated by GUI 110/210/310, according to one implementation, while FIG. 3C shows yet another exemplary page view generated by the GUI 110/210/310. It is noted that any features in FIGS. 3A, 3B, and 3C identified by reference numbers identical to those shown in any other of FIG. 3A, 3B, or 3C correspond respectively to those features and may share any of the characteristics attributed to those corresponding features by the present disclosure. As shown by the figures, the content organized and displayed by GUI 110/210/310 in FIGS. 3B and 3C, like the content displayed in FIG. 3A, is also organized as elements, containers, and pages. However, the characteristics of the elements, as well as features of the containers, can vary front page to page.

By way of example, according to the present exemplary implementation, page 360A is the homepage for user application 150/250/250a/250b, and displays homepage art as element 364d within container 362a, and elements 364e and 364f as selectable content items also within container 362a. Container 362b displays selectable elements 364a, 364b, and 364c (hereinafter "elements 364a-364c") as tiles corresponding respectively to Content Source A, Content Source B, and Content Source C. For instance, where user application 150/250/250a/250b provides a media streaming interface, elements 364a-364c may each correspond to a different television (TV) network, movie studio, or commercial streaming service, while each of elements 364e and 364f may be a specific movie, TV series, or TV episode. Alternatively, where user application 150/250/250a/250b provides an online shopping interface, elements 364a-364c may each correspond to a different e-retailer, while each of elements 364e and 364f may be specific items offered for purchase. As yet other alternatives, where user application 150/250/250a/250b provides an interface for exploring and obtaining digital books, music, or video games, for example, elements 364a-364c may each be a different distributor of digital books, music, or video games, while each of elements 364e and 364f may be a particular digital book, digital album or music track, or a video game, and so forth.

In the interests of conceptual clarity, FIGS. 3A, 3B, and 3C will be further described by reference to the non-limiting and merely exemplary use case in which each of elements 364a-364c in FIG. 3A is a different source of movie or TV programming content, while each of elements 364e and 364f is a selectable item of content, such as specific movie, TV series, or TV episode, for instance. Selection of element 364b on page 360A (i.e., Content Source B), using input object 354 for example to click on element 364b, results in navigation to page 360B, shown in FIG. 3B. Page 360B displays content items, such as individual movies, or TV series or episodes, for example, available from Content Source B, identified as element 364b in FIG. 3A, which is featured in container 362c on page 360B. Also included in container 362c is "return to previous page" selector 358 enabling navigation from page 360B back to page 360A. As shown in FIG. 3B, page 360B further displays container 362d including elements 364g, 364h, 364i, and 364j corresponding respectively to Content Item A, Content Item B, Content Item C, and Content Item D, as well as container 362e including elements 364k, 364l, 364m, and 364n corresponding respectively to Content Item E, Content Item F, Content Item G, and Content Item H. Also included on page 360B of GUI 110/210/310 are vertical scrolling selectors 356.

Selection of element 364m in FIG. 3B (i.e., Content Item G), using input object 354 for example to click on element 364m, results in navigation to page 360C, shown in FIG. 3C. Page 360C provides container 362f including video player 366 for playing out Content Item G. Also included in container 362f is playhead state controller 368 for video player 366 and "return to previous page" selector 358 enabling navigation from page 360C back to page 360B. As shown in FIG. 3C, page 360C further displays container 362g including elements 364o, 364p, and 364p corresponding respectively to Content Item J. Content Item K, and Content Item L identified by user application 150/250/250a/250b as content related to user selected element 364m (Content Item G).

Figure 4:
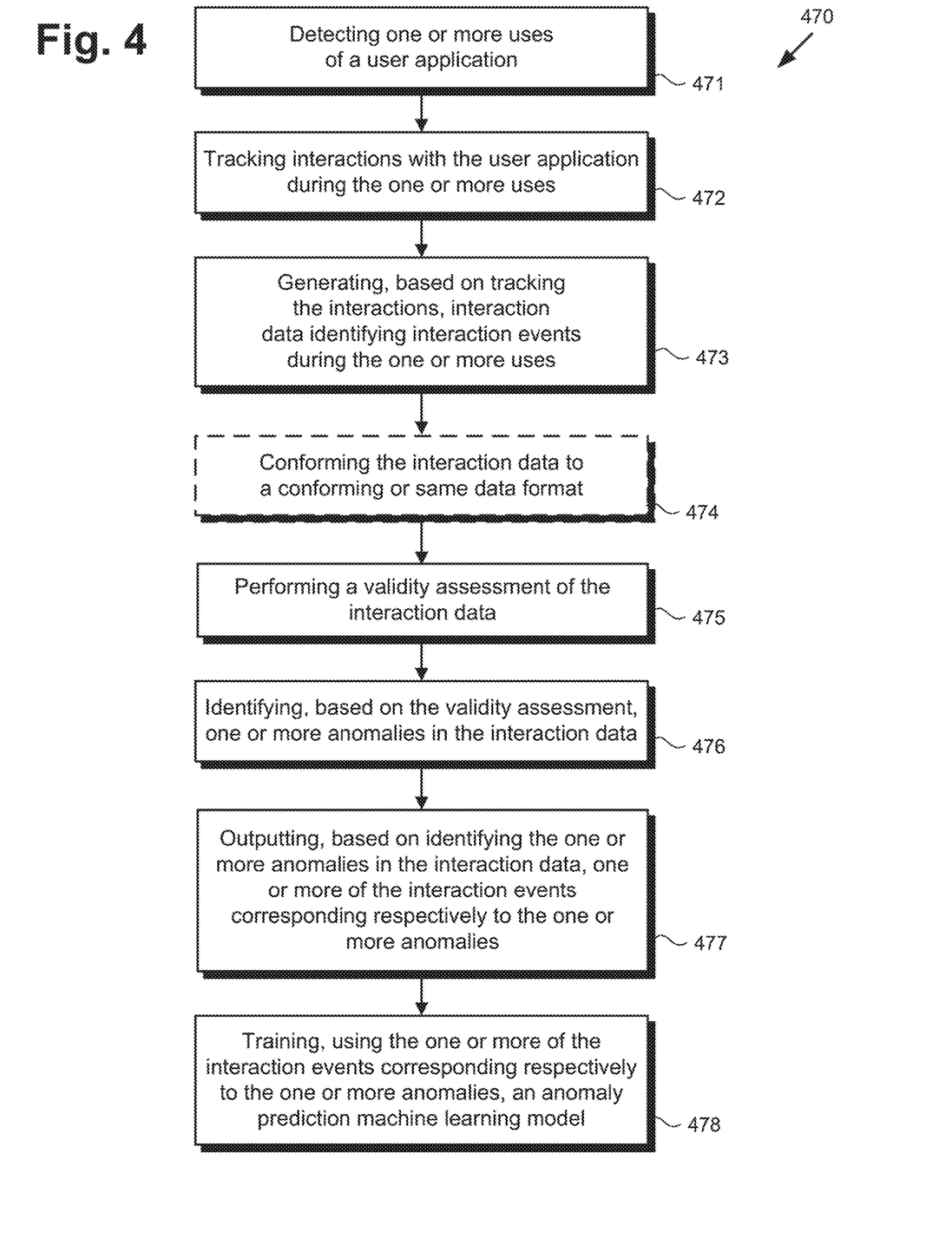
FIG. 4 shows a flowchart presenting an exemplary method for performing automated user application tracking and validation, according to one implementation.

The functionality of software code 108/208 in FIGS. 1 and 2 will be further described by reference to FIG. 4. FIG. 4 shows flowchart 470 presenting an exemplary method for performing automated user application tracking and validation, according to one implementation. With respect to the method outlined by FIG. 4, it is noted that certain details and features have been left out of flowchart 470 in order not to obscure the discussion of the inventive aspects disclosed in the present application.

Referring to FIG. 4 in combination with FIGS. 1 and 2, in some implementations, flowchart 470 may begin with detecting use of user application 150/250/250a/250b (action 471). As noted above, the use of user application 150/250/250a/250b may be a simulated use of user application 150/250 by user emulation bot 112/212, or user emulation bot 112/212 may deploy user application 250a to user device 140a/240a and user application 250b to user device 140b/240b, and may execute user applications 2250a and 250b deployed to respective user devices 140a/240a and 140b/240b. Alternatively, and as also noted above, the use of user application 150/250/250a/250b or a real-world use of one or both of user applications 250a and 250b on respective user devices 140a/240a and 140b/240b by respective users 120a and 120b. Where the use of user application 150/250 is a simulated use by user emulation bot 112/212, that use may be detected in action 471 directly by software code 108/208, executed by hardware processor 104.

Where the use of user application 250a or 250b is a real-world use by one or more of users 120a and 120b, that real-world use may be reported to system 100/200 via communication network 120 and network communication links 122/222. In those implementations, software code 108/208, executed by hardware processor 104/204 of computing platform 102/202, may be configured to communicate with user applications 250a and 250b to detect use of user applications 250a and 250b on respective user devices 140a/240a and 140b/240b.

In implementations in which the method outlined in FIG. 4 begins with action 471, flowchart 470 may continue with tracking interactions with user application 150/2550 or user applications 250a and 250b during its use (action 472). Action 472 may be performed by software code 108/208, executed by hardware processor 104/204 of computing platform 102/202. In some implementations, as shown in FIG. 1, hardware processor 104/204 may execute software code 108/208 to track the interactions with user application 150/250 or user applications 250a and 250b using tracking subsystem 116. For example, and referring to FIGS. 3A, 3B, and 3C in combination with FIGS. 1, 2, and 4, software code 108/208 may be configured to collect explicit information about a users viewport and their behavior by using GUI 110/210/310 and a predetermined set of scalable events. As shown in FIGS. 3A, 3B, and 3C, the structure of GUI 110/210/310 is broken into pages, containers, and elements, which allows for a scalable viewport tracking across the entirety of user application 150/250 or user applications 250a and 250b. For example, according to the exemplary implementation shown in FIGS. 3A, 3B, and 3C, the elements are specific tiles corresponding to content sources or content items, the containers are a specific arrangement of tiles, and pages are a particular configuration of containers, such as a homepage, shown as page 360A in FIG. 3A.

It is noted that, in some implementations, tracking of interactions with user application 150/250 or user applications 250a and 250b may be performed substantially continuously. As a result, in those implementations, action 471 may be omitted, and the method outlined by flowchart 470 may begin with action 472.

Flowchart 470 may further include generating, based on tracking the interactions in action 472, interaction data 124 identifying interaction events during the use (action 473). Action 473 may be performed by software code 108/208, executed by hardware processor 104/204 of computing platform 102/202. In some implementations, as shown in FIG. 1, hardware processor 104/204 may execute software code 108/208 to generate interaction data 124 using tracking subsystem 116. For example, as one of users 120a or 120b interacts with respective user applications 250a or 250b, or as user emulation bot 112/212 interacts with user application 150/250 or user applications 250a and 250b, the display state of GUI 110/210/310 at each level in the hierarchy, e.g., page, container, element, may be logged as an individual record. The interaction events may include one or more of a click-through using input object 354, a scrolling input using horizontal scrolling selectors 352 or vertical scrolling selectors 356, a text entry, a menu selection, or a return-to-previous-page input using "return to previous page" selector 358.

In addition to the active input events described above, i.e., a scrolling input, text entry, menu selection, or return-to-previous-page input, the interaction events may include objects and elements that are merely viewed during use of user application 150/250 or user applications 250a and 250b. For example, if the user application is viewed as shown in FIG. 3A, the "interaction events" may include the page view displaying elements 364a, 364b, 364c, 364d, 364e, and 364f as page 360A, as well as whether the user affirmatively selected one or more of those elements.

As noted above, each instance of an element presented via GUI 110/210/310 is associated with the unique container ID of the container in which it appears and with the unique page ID of the page on which it appears. Thus, the record for an interaction event involving a particular element, whether it is an affirmative input event or a page view, includes the element ID for the element viewed or selected, as well as the unique container ID of the container in which the element appears, and the unique page ID of the page on which the container including the element is displayed. In other words, although an element ID is unique to a particular element, it is not unique to a particular view of the element, which, however, is uniquely identified by the combination of that element's ID with the unique container and page IDs included in the view.

Each individual record may include a primary key as well as one or more foreign keys that link records across the structural hierarchy and tabulates them together to recreate the journey of user 120a or 120b through user respective user application 250a or 250b, or the journey of user emulation bot 112/212 through user application 150/250. Those primary and foreign keys are derived from the element IDs, container IDs, and page IDs described above, where the unique container ID and unique page ID corresponding to a particular view of an element are the foreign keys for that interaction event, while the combination of those foreign keys with the element ID forms the primary key or unique "view ID" for that instance of the element. The use of primary and foreign keys not only allows tracking of the number of times a particular element is interacted with by being viewed or selected, but also advantageously enables tracking the context in which those interactions occur.

In the case of real-world use of user devices 140a/240a and 140b/240b, the records may be saved on the user devices and may be transmitted to validation subsystem 130 in real-time batches where they can be validated. That is to say, the interaction data 124 includes the display state of GUI 110/210 when each interaction events occur, as well as a primary key and one or more foreign keys for each individual record. It is noted that in use cases in which the use of user application 150/250 is a simulated use of one or more versions of user application 150/250 by user emulation bot 112/212, the interaction events identified by interaction data 124 are scripted interactions executed by user emulation bot 112/212.

With the simple, scalable tracking approach disclosed in the present application it is not only possible to recreate a user's journey through the user application, but also to track a variety of reporting key performance indicators (KPIs) such as click-through-rate (CTR), cross page navigation, watch origin, search performance, content playout, and changes in playhead state, as well as to determine user engagement with new features. Moreover, the present unified tracking framework enables scaling across all versions of user application 150/250, and also to adjust to new pages and features within user application 150/250.

In use cases in which the use of user application 150/250 is a simulated use of a version of user application 150/250 by user emulation bot 112/212, flowchart 470 may continue directly from action 473 to action 475. However, in use cases in which the use of user applications 250a and 250b are real-world uses of different user application versions, or use cases in which the simulated use of multiple versions of user application 150/250 by user emulation bot 112/212 are evaluated concurrently, flowchart 470 may optionally include conforming interaction data 124 to a conforming or same data format (action 474).

For example, where the use of the user application includes the use of a first version of the user application (i.e., user application 250a) configured for use by the user device platform architecture of user device 140a/240a, and another use of a second version of the user application (i.e., user application 250b) configured for use by the user device platform architecture of user device 140b/240b, first user interaction data 126a/226a and second user interaction data 126b/226b may have data formatting discrepancies with respect to one another. In those use cases, first user interaction data 126a/226a and second user interaction data 126b/226b may be conformed to the conforming or same data format and may be saved as interaction data 124 in that conforming or same data format.

First user interaction data 126a/226a and second interaction data 126b/226b may be filtered using one or more filter parameters. Examples of such filter parameters may include a time range, cohort, user application version, or the country or geographic region from which the user interaction originated, to name a few. First user interaction data 126a/226a and second user interaction data 126b/226b may then be preprocessed, which may include forming groups of similar data across the user application versions and performing a transformation of the data into a unified shape for subsequent analysis using an appropriate validation algorithm. For instance, the framework utilized by tracking subsystem 130 can be used to join together similar types of interaction events across different user application versions into groups, and to reformat them for use as inputs to each group's corresponding validation algorithm.

Flowchart 470 further includes performing a validity assessment of interaction data 124 (action 475). The validity assessment of interaction data 124 may be performed by software code 108/208, executed by hardware processor 104/204 of computing platform 102/202. In some implementations, as shown in FIG. 1, hardware processor 104/204 may execute software code 108/208 to perform the validity assessment in action 475 using validation subsystem 130. In use cases in which the use of user application 150/250 is a simulated user of the user application by user emulation bot 112/212, hardware processor 104/204 may be configured to perform the validity assessment in response to the use of user application 150/250 by user emulation bot 112/212. In some implementations, for example, hardware processor 104/204 may be configured to perform validation of interaction data 124 in real-time with respect to the use of user application 150 by user emulation bot 112.

In implementations in which the exemplary method outlined by flowchart 470 includes action 474, the validity assessment performed in action 475 may be performed on interaction data 124 conformed to the conforming or same data format. For each data group described above, the corresponding validation algorithm may be applied to ensure usability of interaction data 124 for downstream data science and data analytics uses. The validity assessment may include identifying missing or incorrect sequences of events, unintended data duplication and non-unique primary keys across interaction event pairs, and incorrectly generated primary and foreign keys across interaction event pairs. The validation assessments for each group may then be aggregated and sorted for each user application version, or for different combinations of user application versions.

In some implementations, the validity assessment performed in action 475 may utilize one or more sequences of the interaction events described by interaction data 124. In those implementations, a vector representation of each sequence may be generated and the essential characteristic of the sequence may be identified based on the first occurrence of each interaction event of the sequence. For example, each interaction event in a sequence may be assigned a vector index in one dimension, and the number of occurrences of the event in the sequence in a second vector dimension. A third vector dimension may denote when the interaction event first occurred, e.g., its earliest position in a time series for the sequence.

In action 475, hardware processor 104/204 may execute software code 108/208 to generate an interaction vector corresponding to a sequence of interaction events, identify an expected-value vector using a first interaction event of the sequence, compare the interaction vector to the expected-value vector, and determine, based on the comparison, a validity score for the interaction vector. Alternatively, in some implementations, the interaction vector may be generated using validation subsystem 130. Moreover, in some implementations, the validity assessment in action 475 may be performed without computing the validity score for the interaction vector, but rather by means of comparison with a binary outcome. That is to say, if an observed interaction vector matches any other vector within a set of expected-value vectors, the interaction vector may be determined to be valid.

Figure 5:
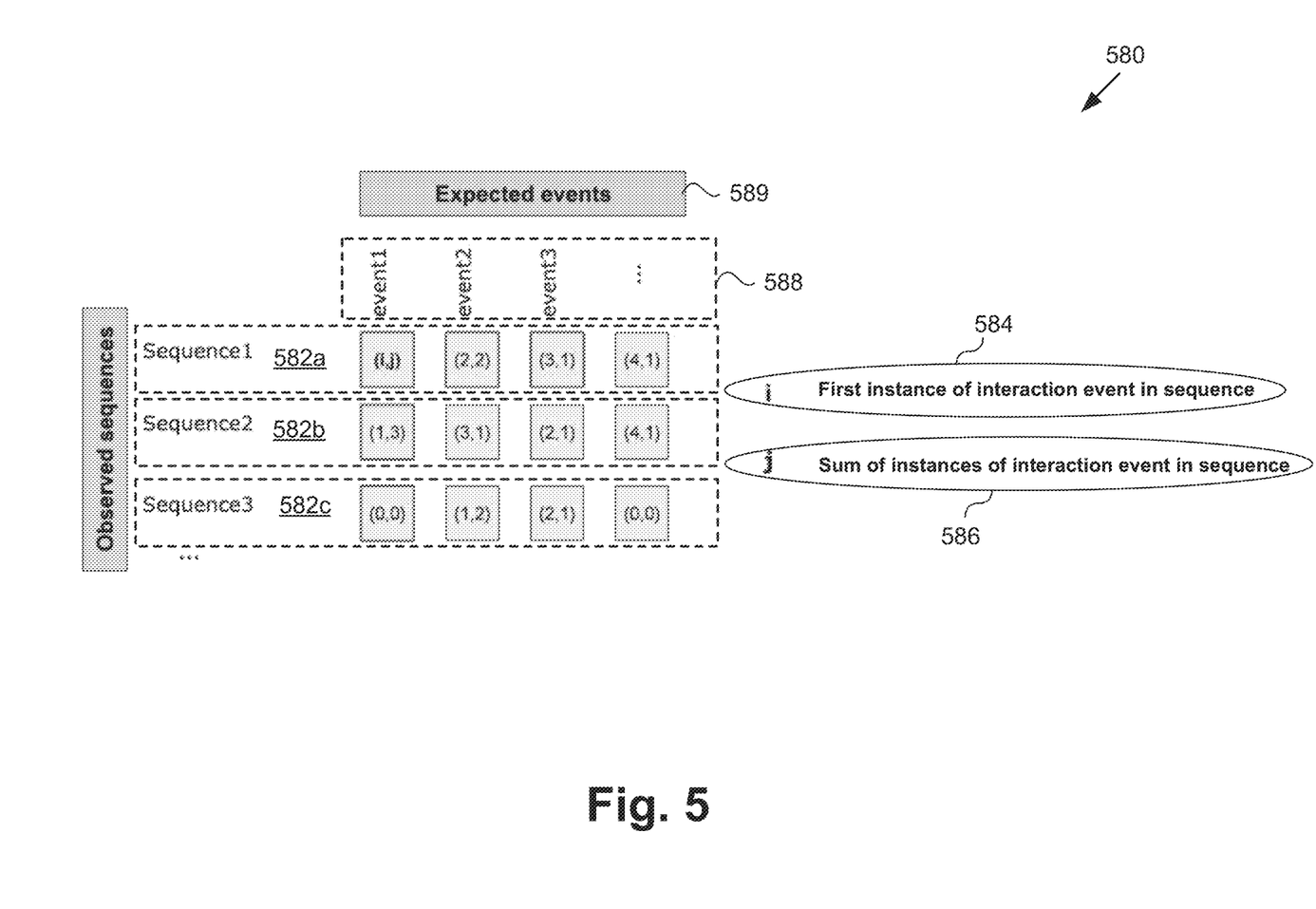
FIG. 5 shows a diagram depicting an exemplary process for performing a validation assessment of interaction data generated by the systems shown in FIGS. 1 and 2, according to one implementation.

Referring to FIG. 5, FIG. 5 shows diagram 500 depicting an exemplary process for performing a validation assessment in action 475, according to one implementation. Diagram 500 shows interaction vectors 582a, 582b, and 582c (hereinafter "interaction vectors 582a-582c") corresponding respectively to different sequences of tracked interaction events 588, as well as expected events 589. As also shown by Diagram 500, for each of interaction events 588 represented in interaction vectors 582a-582c interaction vectors 582a-582c encode the first instance of the interaction event in the sequence in vector dimension "i", and the sum of instances of the interaction event in the sequence in vector dimension "j".

Flowchart 470 may further include identifying, based on the validity assessment performed in action 475, one or more anomalies in interaction data 124 (action 476). When sequences of interaction events are logged and obtained front user devices 140a/240a and 140b/240b, for example, and interaction data 124 is conformed to the conforming or same data format, the sequences of interaction events described by interaction data 124 may be vectorized as described above and may be compared to expected-value vectors in order to calculate an anomaly score for each sequence. Such comparisons may be performed based on predefined rules, where expected sequences are also mapped into vectors and a similarity function is applied to compare the expected-value vectors and the vectors generated from the tracked interaction event sequences. For instance, an actual vector that begins with a "video player loading" interaction event may be compared to an expected-value vector that describes what interaction events should follow the video player being loaded. If the measured similarity between the two vectors is below a predetermined threshold, then the tracked sequence of event interactions, or one or more interaction events included in the sequence, may be determined to be anomalous. In some implementations, action 476 may be performed by software code 108/208, executed by hardware processor 104/204 of computing platform 102/202. Furthermore, in some implementations, action 476 may be performed using validation subsystem 130.

In some implementations, the exemplary method outlined by flowchart 470 can conclude with outputting, based on identification of the one or more anomalies in interaction data 124, one or more of the plurality of interaction events corresponding respectively to the one or more anomalies as anomalous interaction event(s) 114/214 (action 477). As noted above, anomalous interaction event(s) 114/214 may include one or more of missing or incorrect sequences of events, unintended data duplication and non-unique primary keys across interaction event pairs, and incorrectly generated primary and foreign keys across interaction event pairs, for example. Action 477 may be performed by software code 108/208, executed by hardware processor 104/204 of computing platform 102/202. Anomalous interaction event(s) 114/214 may be output via automated email, Slack, or JIRA notification, and may be utilized in root-cause analysis to improve the performance of tracking subsystem 116, for example.

It is noted that one example of anomalous interaction event(s) 114/214 may include any type of invalid reference between what element was viewed by a user and what element was selected by the user (e.g., referring to FIG. 3B, interaction data reports a click on element 364h but element 364h was never viewed by the user). Another example results from interaction data 124 that does not capture the user behavior correctly (e.g., in reality the user clicked on element 364a but interaction data 124 reports a click on element 364c). As yet another example, anomalous interaction event(s) 114/214 may include incorrect sequences of events (e.g., element 364a must be viewed before being selected but interaction data reports element 364a as being selected before being viewed).

In some implementations, hardware processor 104/204 may execute software code 108/208 to perform action 478 by using the one or more interaction events corresponding respectively to the one or more anomalies (i.e., anomalous interaction events 114/214), to train anomaly prediction model 134 of validation subsystem 130. For example, the interaction event sequence vectors used to identify the one or more anomalies in interaction data 124 may be used as training data to build or update anomaly prediction model 134. Anomaly prediction model 134 may then be used to perform validity assessments, either in addition to existing algorithms utilized by validation system 130, or in lieu of those algorithms.

It is emphasized that in various implementations, actions 471, 472, and 473 (hereinafter "actions 471-473") and actions 475, 476, and 477 (hereinafter "actions 475-477"), or actions 471-473, 474, and 475-477, or actions 471-473, 475-477, and 478, or actions 471-473, 474, 475-477, and 478 may be performed in an automated process from which participation of a human system administrator may be omitted.

Thus, the present application discloses systems and methods for performing user application tracking and validation that address and overcome the drawbacks and deficiencies in the conventional art. The present tracking and validation solution advances the state-of-the-art in at least three substantial ways.

First, existing solutions for automated application testing focus only on validating the core functionality of an application, for example does a click input open the correct next page, but fail to track a user's real or simulated sequence of interactions across the entirety of a user's interactive experience with the application, as is performed by the present tracking and validation solution. Second, existing analytical tools can either provide generic metrics like which page a user visited, or highly granular metrics like how many times a particular element was clicked. However, in contrast to the present solution, those conventional analytical tools fail to relate different metrics to one another to generate an understanding of the user's journey or of the exact display state of the GUI when a particular interaction event occurred. Third, the present tracking and validation solution enables anomaly detection of machine-generated, e.g., user emulation bot 112/212 generated data in real-time, which provides a number of advantages. For example, information about simulated user actions are entirely controllable and predetermined, and consequently can be passed as metadata parameters to validation subsystem 130, thereby enabling highly scalable and accurate validation scoring. Moreover, automated real-time validation scoring can be used in the application release process to prevent release of one or more versions of user application 150/250 if anomalies are detected, until the issues giving rise to those anomalies are resolved (including automated JIRA ticket creation), which can significantly reduce the time needed for post-release bug identification and remediation.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a hardware processor and a system memory storing a software code;
   the hardware processor configured to execute the software code to:
   track interactions with a user application during a use of the user application;
   generate, based on tracking the interactions, interaction data identifying a plurality of interaction events during the use, the interaction data including a plurality of states of the user application each corresponding to one of the plurality of interaction events, wherein each of the plurality of states of the user application is assigned at least one key that is included in the interaction data to link the plurality of states to recreate the interactions of the user;
   perform a validity assessment of the interaction data;
   identify, based on the validity assessment, one or more anomalies in the interaction data; and
   output, based on identifying the one or more anomalies in the interaction data, one or more of the plurality of interaction events corresponding respectively to the one or more anomalies.

2. The system of claim 1, wherein the hardware processor is configured to perform the validity assessment in response to the use of the user application by a user emulation bot, wherein the plurality of interactions are scripted interactions executed by the user emulation bot.

3. The system of claim 1, wherein the user application is configured to provide a graphical user interface (GUI), and wherein the plurality of states include a display state of the GUI.

4. The system of claim 3, wherein the at least one key includes a primary key and a foreign key assigned to the display state of the GUI.

5. The system of claim 1, wherein the plurality of interaction events include at least one of a page view, a click-through, a scrolling input, a text entry, a menu selection, or a return-to-previous-page input.

6. The system of claim 1, wherein the hardware processor is further configured to execute the software code to perform the validity assessment using a sequence of the plurality of interaction events, by:
   generating an interaction vector corresponding to the sequence; and
   determining a validity score for the interaction vector.

7. The system of claim 6, wherein the hardware processor is further configured to execute the software code to perform the validity assessment by:
   identifying an expected-value vector using a first interaction event of the sequence; and
   comparing the interaction vector to the expected-value vector to determine the validity score for the interaction vector.

8. The system of claim 6, wherein the validity score is determined by applying the interaction vector to an anomaly prediction model.

9. The system of claim 6, wherein, for each interaction event of the plurality of interaction events of the sequence, the interaction vector encodes a first instance of the each interaction event in the sequence and a cumulative sum of instances of the each interaction event in the sequence.

10. The system of claim 1, wherein the hardware processor is further configured to execute the software code to:
    train an anomaly prediction machine learning model, using the one or more of the plurality of interaction events corresponding respectively to the one or more anomalies;
    wherein the validity assessment of the interaction data is performed using the anomaly prediction machine learning model.

11. A method for use by a system including a computing platform having a hardware processor and a system memory storing a software code, the method comprising:
    tracking, by the software code executed by the hardware processor, interactions with a user application during a use of the user application;
    generating, by the software code executed by the hardware processor and based on tracking the interactions, interaction data identifying a plurality of interaction events during the use, the interaction data including a plurality of states of the user application each corresponding to one of the plurality of interaction events, wherein each of the plurality of states of the user application is assigned at least one key that is included in the interaction data to link the plurality of states to recreate the interactions of the user;
    performing, by the software code executed by the hardware processor and using the validation subsystem, a validity assessment of the interaction data;
    identifying, by the software code executed by the hardware processor and based on the validity assessment, one or more anomalies in the interaction data; and
    outputting, by the software code executed by the hardware processor and based on identifying the one or more anomalies in the interaction data, one or more of the interaction events corresponding respectively to the one or more anomalies.

12. The method of claim 11, wherein the hardware processor is configured to perform the validity assessment in response to the use of the user application by a user emulation bot, wherein the plurality of interactions are scripted interactions executed by the user emulation bot.

13. The method of claim 11, wherein the user application is configured to provide a graphical user interface (GUI), and wherein the plurality of states include a display state of the GUI.

14. The method of claim 13, wherein the at least one key includes a primary key and a foreign key assigned to the display state of the GUI.

15. The method of claim 11, wherein the plurality of interaction events include at least one of a page view, a click-through, a scrolling input, a text entry, a menu selection, or a return-to-previous-page input.

16. The method of claim 11, wherein the validity assessment is performed using a sequence of the plurality of interaction events, by:
generating, by the software code executed by the hardware processor, an interaction vector corresponding to the sequence; and
determining, by the software code executed by the hardware processor, a validity score for the interaction vector.

17. The method of claim 16, wherein the validity assessment is further performed by:
identifying, by the software code executed by the hardware processor, an expected-value vector using a first interaction event of the sequence; and
comparing, by the software code executed by the hardware processor, the interaction vector to the expected-value vector to determine the validity score for the interaction vector.

18. The method of claim 16, wherein the validity score is determined by applying the interaction vector to an anomaly prediction model.

19. The method of claim 16, wherein, for each interaction event of the plurality of interaction events of the sequence, the interaction vector encodes a first instance of the each interaction event in the sequence and a cumulative sum of instances of the each interaction event in the sequence.

20. The method of claim 11, further comprising:
training an anomaly prediction machine learning model, using the one or more of the plurality of interaction events corresponding respectively to the one or more anomalies;
wherein performing the validity assessment of the interaction data uses the anomaly prediction machine learning model.

* * * * *